(12) United States Patent
Liaw et al.

(10) Patent No.: US 9,109,066 B2
(45) Date of Patent: Aug. 18, 2015

(54) METHOD FOR PREPARING A FLAME RETARDANT MODIFIED ACRYLONITRILE-BASED COPOLYMER AND A FLAME RETARDANT FIBROUS MATERIAL

(71) Applicant: FORMOSA PLASTICS CORPORATION, Kaohsiung (TW)

(72) Inventors: Chi-Song Liaw, Kaohsiung (TW); Jin-Pon Wu, Kaohsiung (TW); Kai-Yao Shih, Kaohsiung (TW); Tsung-Hsi Lee, Kaohsiung (TW); Hsiu Chen, Kaohsiung (TW); Ming-I Hsu, Kaohsiung (TW); Chin-Wang Lung, Kaohsiung (TW); Chao-Cheng Chen, Kaohsiung (TW); Chia-Yu Hsieh, Kaohsiung (TW); Sheng-Hsun Lin, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 0 days.

(21) Appl. No.: 14/146,338

(22) Filed: Jan. 2, 2014

(65) Prior Publication Data
US 2015/0183910 A1 Jul. 2, 2015

(51) Int. Cl.
*C08L 69/00* (2006.01)
*C08K 5/42* (2006.01)
*C08F 220/44* (2006.01)
*D01F 6/40* (2006.01)

(52) U.S. Cl.
CPC ............... *C08F 220/44* (2013.01); *D01F 6/40* (2013.01)

(58) Field of Classification Search
USPC .................................. 525/238, 239; 526/343
See application file for complete search history.

(56) References Cited

U.S. PATENT DOCUMENTS 3,313,867 A * 4/1967 Blackburn et al. ............ 524/230
3,781,248 A * 12/1973 Sakai et al. ................... 526/225

* cited by examiner

*Primary Examiner* — Robert Harlan
(74) *Attorney, Agent, or Firm* — Birch, Stewart, Kolasch & Birch, LLP

(57) ABSTRACT

A method for preparing a flame retardant modified acrylonitrile-based copolymer, includes: prepolymerizing a first composition to obtain a first prepolymer solution including a first prepolymer; prepolymerizing a second composition to obtain a second prepolymer solution including a second prepolymer; and mixing the first and second prepolymer solutions and subjecting a mixture of the first and second prepolymers to polymerization to obtain a flame retardant modified acrylonitrile-based copolymer solution containing a flame retardant modified acrylonitrile-based copolymer.

18 Claims, No Drawings

METHOD FOR PREPARING A FLAME RETARDANT MODIFIED ACRYLONITRILE-BASED COPOLYMER AND A FLAME RETARDANT FIBROUS MATERIAL

BACKGROUND OF THE INVENTION

1. Field of the Invention

This invention relates to a method for preparing a flame retardant modified acrylonitrile-based copolymer and a flame retardant fibrous material comprising the flame retardant modified acrylonitrile-based copolymer.

2. Description of the Related Art

Acrylic fiber is made from polyacrylonitrile, and has excellent chemical and physical properties, such as dyeing affinity, tactile feeling, and light resistance. However, it has poor flame retardance, which restricts its use for production of anti-flammable textile products, such as anti-flammable curtains, carpets, and clothes.

It has been found that acrylonitrile-based copolymer, which maintains the excellent chemical and physical properties of polyacrylonitrile, is a better candidate for making anti-flammable textiles.

In order to improve the flame retardance of acrylonitrile-based copolymer, several methods have been proposed to modify the acrylonitrile-based copolymer, such as addition of a halogen-containing monomer (which provides a flame retardant function), such as vinylidene chloride, and/or addition of flame retardant agents into a reaction system to form the modified acrylonitrile-based copolymer. Conventionally, the reaction system contains 20 wt % to 50 wt % of vinylidene chloride. However, addition of the halogen-containing monomer in such an amount in the reaction system complicates the copolymerization reaction, and results in a considerable reduction in the polymerization degree of the modified acrylonitrile-based copolymer.

SUMMARY OF THE INVENTION

Therefore, an object of the present invention is to provide a method for preparing a flame retardant modified acrylonitrile-based copolymer that can overcome at least one of the aforesaid drawbacks associated with the prior art.

According to one aspect of this invention, there is provided a method for preparing a flame retardant modified acrylonitrile-based copolymer. The method comprises: (a) prepolymerizing a first composition to obtain a first prepolymer solution including a first prepolymer; (b) prepolymerizing a second composition to obtain a second prepolymer solution including a second prepolymer; and (c) mixing the first and second prepolymer solutions and subjecting a mixture of the first and second prepolymers to polymerization to obtain a flame retardant modified acrylonitrile-based copolymer solution containing a flame retardant modified acrylonitrile-based copolymer.

The first composition includes acrylonitrile, a halogen-containing vinyl monomer, at least one hydrophilic vinyl monomer, a polar solvent, and a reaction initiator. The halogen-containing vinyl monomer includes vinylidene chloride (VDC). Based on the total weight of vinylidene chloride, the hydrophilic vinyl monomer and acrylonitrile of the first composition, the vinylidene chloride of the first composition is in an amount ranging from 10 to 40 wt % and the hydrophilic vinyl monomer is in an amount ranging from 5 to 50 wt %. The first prepolymer has a weight average molecular weight ranging from 30,000 to 40,000.

The second composition includes acrylonitrile, a halogen-containing vinyl monomer, the polar solvent, and the reaction initiator. The halogen-containing vinyl monomer of the second composition includes vinylidene chloride. Based on the total weight of vinylidene chloride and acrylonitrile of the second composition, vinylidene chloride of the second composition is in an amount ranging from 40 to 60 wt %.

The flame retardant modified acrylonitrile-based copolymer has a weight average molecular weight ranging from 50,000 to 80,000 and contains 30 to 46 wt % of vinylidene chloride monomer unit, 1 to 5 wt % of hydrophilic vinyl monomer unit, and 49 to 69 wt % of acrylonitrile monomer unit based on the total weight of the vinylidene chloride monomer unit, the hydrophilic vinyl monomer unit and the acrylonitrile monomer unit of the flame retardant modified acrylonitrile-based copolymer.

According to another aspect of this invention, there is provided a method for preparing a flame retardant modified acrylonitrile-based copolymer. The method comprises: (a) polymerizing a first composition to obtain a first copolymer solution including a first copolymer; (b) polymerizing a second composition to obtain a second copolymer solution including a second copolymer; and (c) mixing the first and second copolymer solutions to obtain a flame retardant modified acrylonitrile-based copolymer solution containing a flame retardant modified acrylonitrile-based copolymer blend.

The first composition includes acrylonitrile, a halogen-containing vinyl monomer, at least one hydrophilic vinyl monomer, a polar solvent, and a reaction initiator. The halogen-containing vinyl monomer includes vinylidene chloride. Based on the total weight of vinylidene chloride, the hydrophilic vinyl monomer and acrylonitrile of the first composition, vinylidene chloride of the first composition is in an amount ranging from 10 to 40 wt % and the hydrophilic vinyl monomer is in an amount ranging from 5 to 50 wt %. The first copolymer has a weight average molecular weight ranging from 70,000 to 80,000.

The second composition includes acrylonitrile, a halogen-containing vinyl monomer, the polar solvent, and the reaction initiator. The halogen-containing vinyl monomer of the second composition includes vinylidene chloride. Based on the total weight of vinylidene chloride and acrylonitrile of the second composition, vinylidene chloride of the second composition is in an amount ranging from 40 to 60 wt %.

The second copolymer has a weight average molecular weight ranging from 50,000 to 60,000.

The flame retardant modified acrylonitrile-based copolymer blend has a viscosity average molecular weight ranging from 50,000 to 80,000, and contains 30 to 46 wt % of vinylidene chloride monomer unit, 1 to 5 wt % of hydrophilic vinyl monomer unit, and 49 to 69 wt % of acrylonitrile monomer unit based on the total weight of the vinylidene chloride monomer unit, the hydrophilic vinyl monomer unit and the acrylonitrile monomer unit of the flame retardant modified acrylonitrile-based copolymer blend.

According to yet another aspect of this invention, there is provided a flame retardant fibrous material comprising an acrylonitrile-based copolymer fiber that is made from a composition comprising the aforementioned flame retardant modified acrylonitrile-based copolymer. The flame retardant modified acrylonitrile-based copolymer has a limiting oxygen index greater than 27%.

DETAILED DESCRIPTION OF THE PREFERRED EMBODIMENTS

The method of the first preferred embodiment of this invention for preparing a flame retardant modified acrylonitrile-based copolymer comprises: (a) prepolymerizing a first composition to obtain a first prepolymer solution including a first prepolymer, the first composition including acrylonitrile, a halogen-containing vinyl monomer, at least one hydrophilic vinyl monomer, a polar solvent, and a reaction initiator; (b) prepolymerizing a second composition to obtain a second prepolymer solution including a second prepolymer, the second composition including acrylonitrile, a halogen-containing vinyl monomer, the polar solvent, and the reaction initiator; (c) mixing the first and second prepolymer solutions and subjecting a mixture of the first and second prepolymers to polymerization to obtain a flame retardant modified acrylonitrile-based copolymer solution containing a flame retardant modified acrylonitrile-based copolymer; and (d) removing a portion of the polar solvent from the flame retardant modified acrylonitrile-based copolymer solution after step (c), such that the flame retardant modified acrylonitrile-based copolymer is in an amount ranging from 20 to 35 wt % based on the total weight of the flame retardant modified acrylonitrile-based copolymer solution, thereby facilitating wet spinning of the concentrated flame retardant modified acrylonitrile-based copolymer solution to form a flame retardant acrylonitrile-based copolymer fiber having excellent flame retardance and strength.

The halogen-containing vinyl monomer includes vinylidene chloride. The halogen-containing vinyl monomer may further include vinyl chloride (VC), vinyl bromide (VB), vinylidene bromide (VDB), and combinations thereof.

Preferably, the hydrophilic vinyl monomer is selected from a sulfonic group-containing vinyl monomer, a carboxylic group-containing vinyl monomer and their sodium, potassium, ammonium, and quaternary ammonium salt derivatives. Examples of the sulfonic group-containing vinyl monomer include, but are not limited to, sodium methallyl sulfonate (SMAS), sodium 2-acrylamide-2-methylpropane sulfonate (SAMPS), sodium styrene sulfonate (SSS), and sodium allyl sulfonate (SAS). Examples of the carboxylic group-containing vinyl monomer include, but are not limited to, methacrylic acid, acrylic acid, and itaconic acid. The hydrophilic vinyl monomer can improve the hydrophilicity of the first composition and dyeing ability of the flame retardant modified acrylonitrile-based copolymer thus formed. More specifically, sulfonic group of the sulfonic group-containing vinyl monomer can improve the hydrophilicity of the first composition and dyeing ability of the flame retardant modified acrylonitrile-based copolymer. Fibers made from the flame retardant modified acrylonitrile-based copolymer fiber can have a relatively dense structure, thereby preventing devitrification from occurring. However, when the amount of the sulfonic group-containing vinyl monomer in the first composition is excessive, the fibers may encounter the devitrification problem.

Preferably, the polar solvent includes an organic solvent selected from dimethyl formamide, dimethyl acetamide, dimethyl sulfoxide, and combinations thereof. More preferably, the polar solvent is a mixture of the organic solvent and water, and the amount of water is less than 0.5 wt % based on the total weight of the polar solvent.

The initiator can be selected from azo compound, such as azobisisobutyronitrile (AIBN), and azo-bis dimethyl valeronitrile (AVN), and peroxy compound, such as di(2-ethylhexyl) peroxy dicarbonate, t-butyl peroxypivalate, and lauroyl peroxide.

Based on the total weight of vinylidene chloride, the hydrophilic vinyl monomer and acrylonitrile of the first composition, vinylidene chloride of the first composition is in an amount ranging from 10 to 40 wt % and the hydrophilic vinyl monomer is in an amount ranging from 5 to 50 wt %.

Preferably, the weight ratio of vinylidene chloride to acrylonitrile of the first composition ranges from 2:1 to 3.5:1.

More preferably, based on the total weight of vinylidene chloride, the hydrophilic vinyl monomer and acrylonitrile of the first composition, vinylidene chloride of the first composition is in an amount ranging from 20 to 30 wt %, and the hydrophilic vinyl monomer is in an amount ranging from 5 to 15 wt %.

Preferably, the first composition further comprises a dyeing auxiliary.

Preferably, the first composition further comprises a yellowing inhibitor for suppressing yellowing of the flame retardant modified acrylonitrile-based copolymer, and/or a recombination inhibitor for controlling the reaction rate of prepolymerization and the molecular weight of the first prepolymer. The yellowing inhibitor is selected from malic acid and its salt. The recombination inhibitor is selected from hydroquinone (HQ), 4-methoxyphenol (MEHQ), isopropanol, and mercaptan.

Preferably, the prepolymerization in step (a) is conducted under a temperature ranging from 20 to 70° C. and a pH value ranging from 5 to 13.

The first prepolymer has a weight average molecular weight preferably ranging from 30,000 to 40,000, more preferably, from 35,000 to 40,000.

The halogen-containing vinyl monomer of the second composition includes vinylidene chloride.

Based on the total weight of vinylidene chloride and acrylonitrile of the second composition, vinylidene chloride of the second composition is in an amount ranging from 40 to 60 wt %.

Preferably, based on the total weight of vinylidene chloride and acrylonitrile of the second composition, vinylidene chloride of the second composition is in an amount ranging from 45 wt % to 55 wt %.

Preferably, the second composition is substantially free of the hydrophilic vinyl monomer. Preferably, the prepolymerization in step (b) is conducted under a temperature ranging from 20 to 70° C. and a pH value ranging from 5 to 13.

Preferably, the second prepolymer has a weight average molecular weight ranging from 30,000 to 40,000.

The flame retardant modified acrylonitrile-based copolymer has a weight average molecular weight ranging from 50,000 to 80,000, and contains 30 to 46 wt % of vinylidene chloride monomer unit, 1 to 5 wt % of hydrophilic vinyl monomer unit, and 49 to 69 wt % of acrylonitrile monomer unit based on the total weight of the vinylidene chloride monomer unit, the hydrophilic vinyl monomer unit and the acrylonitrile monomer unit of the flame retardant modified acrylonitrile-based copolymer.

Preferably, the weight ratio of the first prepolymer solution to the second prepolymer solution in step (c) ranges from 0.1:1 to 10:1.

Preferably, the flame retardant modified acrylonitrile-based copolymer contains 38 to 42 wt % of the vinylidene chloride monomer unit, 2.5 to 5 wt % of the hydrophilic vinyl monomer unit, and 55.5 to 59.5 wt % of the acrylonitrile monomer unit based on the total weight of the vinylidene chloride monomer unit, the hydrophilic vinyl monomer unit and the acrylonitrile monomer unit of the flame retardant modified acrylonitrile-based copolymer.

The amount of the vinylidene chloride of the first composition is preferably much less than that of the second composition, so that the first composition has a property of less flame retardance and the second composition has a property of greater flame retardance. It has been unexpectedly found that by formulating the first and second compositions to form the first and second prepolymers according to the method of this invention and then mixing and polymerizing the first and second prepolymers, a higher degree of copolymerization of forming the flame retardant modified acrylonitrile-based copolymer can be easily achieved and the aforesaid drawbacks associated with the prior art can be alleviated.

The flame retardant modified acrylonitrile-based copolymer of this invention is useful for production of a flame retardant fibrous material. Preferably, the flame retardant modified acrylonitrile-based copolymer has a limiting oxygen index greater than 27%.

Preferably, the flame retardant fibrous material further contains an auxiliary fiber selected from the group consisting of a natural fiber, a synthetic fiber, and the combination thereof. One example of the natural fiber is cotton. Examples of the synthetic fiber include acrylic fibers, polyester fiber, and the combination thereof.

Preferably, the flame retardant fibrous material further contains a flame retardant selected from the group consisting of $Sb_2O_5$, $Sb_2O_3$, $Al(OH)_3$, $Mg(OH)_2$, and combinations thereof.

The method of the second preferred embodiment of this invention for preparing a flame retardant modified acrylonitrile-based copolymer includes the steps of: (a) polymerizing a first composition to obtain a first copolymer solution including a first copolymer; (b) polymerizing a second composition to obtain a second copolymer solution including a second copolymer; (c) mixing the first and second copolymer solutions to obtain a flame retardant modified acrylonitrile-based copolymer solution containing a flame retardant modified acrylonitrile-based copolymer blend; and (d) removing a portion of polar solvent from the flame retardant modified acrylonitrile-based copolymer solution after step (c), such that the flame retardant modified acrylonitrile-based copolymer blend is in an amount ranging from 20 to 35 wt % based on the total weight of the flame retardant modified acrylonitrile-based copolymer solution, thereby facilitating wet spinning of the concentrated flame retardant modified acrylonitrile-based copolymer solution to forma flame retardant acrylonitrile-based copolymer fiber having excellent flame retardance and strength. The first and second compositions of the second preferred embodiment are the same as those of the first preferred embodiment, respectively. The first copolymer preferably has a weight average molecular weight ranging from 70,000 to 80,000. The second copolymer preferably has a weight average molecular weight ranging from 50,000 to 60,000. The flame retardant modified acrylonitrile-based copolymer blend preferably has a viscosity average molecular weight ranging from 50,000 to 80,000.

By formulating the first and second compositions according to the method of this invention, a high degree of polymerization of forming the first copolymer can be easily achieved, which, in turn, facilitates the formation of a high weight average molecular weight of the flame retardant modified acrylonitrile-based copolymer blend by blending with the second copolymer, thereby overcoming the aforesaid drawbacks associated with the prior art.

The merits of the method for preparing the flame retardant modified acrylonitrile-based copolymer and the copolymer blend of this invention will become apparent with reference to the following Examples and Comparative Examples. The method of this invention should not be restricted to the following Examples.

EXAMPLES

Example 1

Ex1

Preparation of the First Prepolymer Solution

In the preparation of the first prepolymer solution of Example 1, acrylonitrile (AN), vinylidene chloride (VDC) serving as the halogen-containing vinyl monomer, sodium methallyl sulfonate (SMAS) serving as the hydrophilic vinyl monomer, and azo-bis dimethyl valeronitrile (AVN) serving as the initiator were dissolved in dimethyl formamide to form the first composition. The first composition contained 460 ppm AVN. The weight ratio of AN:VDC:SMAS was 65:20:15, and the total weight of AN, VDC, and SMAS was 35 wt % based on the total weight of the first composition.

The first composition was prepolymerized under pH 7.5 and 45° C. for 17 hours to obtain a first prepolymer solution containing a first prepolymer which had a weight average molecular weight ranging from 35,000 to 40,000.

Preparation of the Second Prepolymer Solution

In the preparation of the second prepolymer solution of Example 1, AN, VDC, and AVN were dissolved in dimethyl formamide to form the second composition. The second composition contained 800 ppm AVN. The weight ratio of AN:VDC was 55:45, and the total weight of AN and VDC was 50 wt % based on the total weight of the second composition.

The second composition was prepolymerized under pH 7.5 and 53° C. for 16 hours to obtain a second prepolymer solution including a second prepolymer which had a weight average molecular weight ranging from 35,000 to 40,000.

Preparation of the Flame Retardant Modified Acrylonitrile-Based Copolymer

The first and second propolymer solutions were mixed in a weight ratio of 1:3 to form a mixture. 800 ppm of AVN was added into the mixture. The mixture was polymerized under 50° C. for 10 hours to obtain a flame retardant modified acrylonitrile-based copolymer solution including a flame retardant modified acrylonitrile-based copolymer. The modified acrylonitrile-based copolymer contained 56.4 wt % of AN monomer unit, 39.9 wt % of VDC monomer unit, and 3.5 wt % of SMAS monomer unit, and had a weight average molecular weight of 61,000.

Formation of the Flame Retardant Modified Acrylonitrile-Based Copolymer Fiber

The flame retardant modified acrylonitrile-based copolymer solution was fed into a film evaporator to remove a portion of the polar solvent, such that the concentrated flame retardant modified acrylonitrile-based copolymer solution had a solid content of 26 wt % (solid content=the content of flame retardant modified acrylonitrile-based copolymer) based on the total weight of the flame retardant modified acrylonitrile-based copolymer solution.

The concentrated flame retardant modified acrylonitrile-based copolymer solution was used as a spinning dope solution for wet spinning, in which the spinning dope solution was extruded, followed by being stretched to three times its original dimension, washed with water, dried, and being further stretched to two times of the last dimension under 100° C. so as to obtain a flame retardant modified acrylonitrile-based copolymer fiber.

The first and second compositions and the weight average molecular weight of the modified acrylonitrile-based copolymer of Example 1 are listed in Table 1.

Examples 2 and 3

EX2 and EX3

The procedures and conditions in preparing the flame retardant modified acrylonitrile-based copolymer fibers of Examples 2 and 3 were similar to those of Example 1 except for the first composition and the prepolymerization time of the first composition.

The hydrophilic vinyl monomers of the first composition of Examples 2 and 3 were sodium 2-acrylamide-2-methyl-propane sulfonate (SAMPS) and sodium styrene sulfonate (SSS), respectively. The prepolymerization time of the first composition of Examples 2 and 3 was 15 hours.

The first and second compositions and the weight average molecular weights of the modified acrylonitrile-based copolymers of Examples 2 and 3 are listed in Table 1.

Example 4

EX4

The procedures and conditions in preparing the flame retardant modified acrylonitrile-based copolymer fiber of Example 4 were similar to those of Example 1 except that the hydrophilic vinyl monomer of the first composition was SAMPS and the weight ratio of AN:VDC:SAMPS of the first composition was 58:27:15, and that the prepolymerization time of the first composition was 10 hours and the prepolymerization time of the second composition was 10 hours. The modified acrylonitrile-based copolymer of Example 4 contained 55.5 wt % of AN monomer unit, 41.5 wt % of VDC monomer unit, and 3.0 wt % of SAMPS monomer unit, had a weight average molecular weight of 62,000, and had a solid content of 28 wt % based on the total weight of the flame retardant modified acrylonitrile-based copolymer solution.

The first and second compositions and the weight average molecular weight of the modified acrylonitrile-based copolymer of Example 4 are listed in Table 1.

Example 5

EX5

The procedures and conditions in preparing the flame retardant modified acrylonitrile-based copolymer fibers of Example 5 were similar to those of Example 4 except for the first composition and the prepolymerization time of the first composition.

The weight ratio of AN:VDC:SAMPS of the first composition was 70:20:10. The prepolymerization time of the first composition was 15 hours. The modified acrylonitrile-based copolymer of Example 5 contained 57.2 wt % of AN monomer unit, 40.0 wt % of VDC monomer unit and 2.8 wt % of SAMPS monomer unit, and had a weight average molecular weight of 61,000.

The first and second compositions and the weight average molecular weight of the modified acrylonitrile-based copolymer of Example 5 are listed in Table 1.

Example 6

EX6

Preparation of the First Copolymer Solution

In the preparation of the first copolymer solution of Example 6, AN, VDC, SAMPS, and AVN were dissolved in dimethyl formamide to form the first composition. The first composition contained 600 ppm AVN. The weight ratio of AN:VDC:SAMPS was 65:27:8, and the total weight of AN, VDC, and SMAS was 40 wt % based on the total weight of the first composition.

The first composition was polymerized under pH 7.5 and 53° C. for 14 hours to obtain a first copolymer solution including a first copolymer having a weight average molecular weight ranging from 70,000 to 80,000.

Preparation of the Second Copolymer Solution

In the preparation of the second copolymer solution of Example 6, AN, VDC, and AVN were dissolved in dimethyl formamide to form the second composition. The second composition contained 800 ppm AVN. The weight ratio of AN:VDC was 55:45, and the total weight of AN and VDC was 50 wt % based on the total weight of the second composition.

The second composition was polymerized under pH 7.5 and 53° C. for 16 hours to obtain a second copolymer solution including a second copolymer having a weight average molecular weight ranging from 50,000 to 60,000.

Preparation of the Flame Retardant Modified Acrylonitrile-Based Copolymer Blend

The first and second copolymer solutions were mixed in a weight ratio of 1:3 to obtain a flame retardant modified acrylonitrile-based copolymer solution including a flame retardant modified acrylonitrile-based copolymer blend. The modified acrylonitrile-based copolymer blend contained 56.3 wt % of AN monomer unit, 40.7 wt % of VDC monomer unit, and 3.0 wt % of SAMPS monomer unit, and had a viscosity average molecular weight (Mw) of 58,000, which was calculated according to the Mark-Houwink relationship:

$$[\eta]=K[Mw]^a$$

where K and a are parameters dependent on the polymer and the solvent used for dissolving the polymer and where η is the intrinsic viscosity.

Formation of the Flame Retardant Modified Acrylonitrile-Based Copolymer Fiber

The procedures and conditions of wet spinning of the flame retardant modified acrylonitrile-based copolymer solution of Example 6 were similar to those of Example 1 except that the solid content of the flame retardant modified acrylonitrile-based copolymer solution was 28 wt % based on the total weight of the flame retardant modified acrylonitrile-based copolymer solution.

The first and second compositions and the weight or viscosity average molecular weight of the modified acrylonitrile-based copolymer blend of Example 6 are listed in Table 1.

Examples 7 and 8

EX7 and EX8

The procedures and conditions in preparing the flame retardant modified acrylonitrile-based copolymer fibers of Examples 7 and 8 were similar to those of example 6 except for the first composition.

The weight ratio of AN:VDC:SAMPS of the first composition of Example 7 was 58:27:15. The modified acrylonitrile-based copolymer blend of Example 7 contained 56.2 wt % of AN monomer unit, 40.1 wt % of VDC monomer unit, and 3.7 wt % of SAMPS monomer unit, and had a viscosity-average molecular weight of 59,000.

The weight ratio of AN:VDC:SAMPS of the first composition of Example 8 was 63:25:12. The modified acrylonitrile-based copolymer blend of Example 8 contained 55.6 wt % of AN monomer unit, 40.1 wt % of VDC monomer unit, and 4.3 wt % of SAMPS monomer unit, and had a viscosity average molecular weight of 61,000.

The first and second compositions and the weight or viscosity average molecular weight of the modified acrylonitrile-based copolymer of Examples 7 and 8 are listed in Table 1.

Examples 9 and 10

EX9 and EX10

The procedures and conditions in preparing the flame retardant modified acrylonitrile-based copolymer fibers of Examples 9 and 10 were similar to those of Example 6 except for the first composition and the weight ratios of the first and second copolymer solutions.

The weight ratio of AN:VDC:SAMPS of the first composition of each of Examples 9 and 10 was 65:25:10. The weight ratios of the first and second copolymer solutions of examples 9 and 10 were 1:2.5 and 1:2, respectively.

The flame retardant modified acrylonitrile-based copolymer blend of Example 9 contained 56.1 wt % of AN monomer unit, 39.5 wt % of VDC monomer unit, and 4.4 wt % of SAMPS monomer unit, and had a viscosity average molecular weight of 58,000. The flame retardant modified acrylonitrile-based copolymer blend of Example 10 contained 56.8 wt % of AN monomer unit, 38.4 wt % of VDC monomer unit, and 4.8 wt % of SAMPS monomer unit, and had a viscosity average molecular weight of 58,000.

The compositions and the weight or viscosity average molecular weight of the modified acrylonitrile-based copolymer blends of Examples 9 and 10 are listed in Table 1.

Comparative Examples 1 and 2

CE1 and CE2

The procedures and conditions in preparing the flame retardant modified acrylonitrile-based copolymer fibers of Comparative Example 1 were similar to those of Example 2 except that the prepolymerization time of the first composition was 10 hours, and the weight ratio of AN:VDC of the second composition was 40:60. The flame retardant modified acrylonitrile-based copolymer of Comparative Example 1 contained 44.7 wt % of AN monomer unit, 51.2 wt % of VDC monomer unit, and 4.1 wt % of SAMPS monomer unit, and had a weight average molecular weight of 58,000.

The procedures and conditions in preparing the flame retardant modified acrylonitrile-based copolymer fiber of Comparative Example 2 were similar to those of Comparative Example 1 except that the weight ratio of AN:VDC of the second composition was 30:70. The flame retardant modified acrylonitrile-based copolymer of Comparative Example 2 contained 36.8 wt % of AN monomer unit, 59.1 wt % of VDC monomer unit, and 4.1 wt % of SAMPS monomer unit, and had a weight average molecular weight of 57,000.

The compositions and the weight average molecular weights of the modified acrylonitriles-based copolymers of Comparative Examples 1 and 2 are listed in Table 1.

Comparative Examples 3 to 5

CE3 to CE5

The procedures and conditions in preparing the flame retardant modified acrylonitrile-based copolymer fibers of Comparative Examples 3 to 5 were similar to those of Example 6 except for the weight ratio of the first and second compositions.

The weight ratio of AN:VDC:SAMPS of the first composition of Comparative Example 3 was 60:20:20. The flame retardant modified acrylonitrile-based copolymer blend of Comparative Example 2 contained 56.2 wt % of AN monomer unit, 38.2 wt % of VDC monomer unit, and 5.6 wt % of SAMPS monomer unit, and had a viscosity average molecular weight of 61,000.

The weight ratio of AN:VDC:SAMPS of the first composition of Comparative Example 4 was 80:10:10. The weight ratio of AN:VDC of the second composition of Comparative Example 4 was 50:50. The flame retardant modified acrylonitrile-based copolymer blend of Comparative Example 4 contained 55.4 wt % of AN monomer unit, 41.0 wt % of VDC monomer unit, and 3.6 wt % of SAMPS monomer unit, and had a viscosity average molecular weight of 60,000.

The weight ratio of AN:VDC:SAMPS of the first composition of Comparative Example 5 was 90:0:10. The weight ratio of AN:VDC of the second composition of Comparative Example 5 was 50:50. The flame retardant modified acrylonitrile-based copolymer blend of Comparative Example 5 contained 57.5 wt % of AN monomer unit, 38.8 wt % of VDC monomer unit, and 3.7 wt % of SAMPS monomer unit, and had a viscosity average molecular weight of 60,000.

Each of the spinning dope solutions of Comparative Examples 3, 4, and 5 was stretched to five times of its original dimension after extrusion.

The first and second compositions and the viscosity average molecular weights of the modified acrylonitrile-based copolymer blends of Comparative Examples 3 to 5 are listed in Table 1.

TABLE 1

|  | 1st composition AN/VDC/ SAMPS (%) | 2nd composition AN/VDC | Weight ratio of 1st:2nd copolymer solutions | Mw or Mv | flame retardant modified acrylonitrile-based copolymer AN/VDC/ SAMPS (%) |
|---|---|---|---|---|---|
| EX1 | 65/20/15 (SMAS) | 55/45 | 1:3 | 61000 | 56.4/39.9/3.5 (SMAS) |
| EX2 | 65/20/15 | 55/45 | 1:3 | 65000 | 56.1/40.1/3.8 |
| EX3 | 65/20/15 (SSS) | 55/45 | 1:3 | 66000 | 55.5/41.2/3.1 (SSS) |
| EX4 | 58/27/15 | 55/45 | 1:3 | 62000 | 55.5/41.5/3.0 |
| EX5 | 70/20/10 | 55/45 | 1:3 | 61000 | 57.2/40.0/2.8 |
| EX6 | 65/27/8 | 55/45 | 1:3 | 58000 | 56.3/40.7/3.0 |
| EX7 | 65/20/15 | 55/45 | 1:3 | 59000 | 56.2/40.1/3.7 |
| EX8 | 63/25/12 | 55/45 | 1:3 | 61000 | 55.6/40.1/4.3 |
| EX9 | 65/20/15 | 55/45 | 1:2.5 | 58000 | 56.1/39.5/4.4 |
| EX10 | 65/20/15 | 55/45 | 1:2 | 58000 | 56.8/38.4/4.8 |
| CE1 | 65/20/15 | 40/60 | 1:3 | 58000 | 44.7/51.2/4.1 |
| CE2 | 65/20/15 | 30/70 | 1:3 | 57000 | 36.8/59.1/4.1 |
| CE3 | 60/20/20 | 55/45 | 1:3 | 61000 | 56.2/38.2/5.6 |
| CE4 | 80/10/10 | 50/50 | 1:3 | 60000 | 55.4/41.0/3.6 |
| CE5 | 90/0/10 | 50/50 | 1:3 | 60000 | 57.5/38.8/3.7 |

The physical properties of the flame retardant modified acrylonitrile-based copolymer fibers of the aforesaid examples and comparative examples were measured. The measured results are listed in Table 2.

Limit Oxygen Index (LOI) Measurement

Limiting oxygen index is a measure of the flammability of a material. The LOI of each of the aforesaid examples and comparative examples was measured as follows.

0.35 g of the flame retardant modified acrylonitrile-based copolymer was rolled into a string for use as a sample. The sample was placed in a combustion chamber (ON-2M, Suga Test Instruments Co. Ltd.), and was ignited in the presence of a gas mixture of oxygen and nitrogen in the combustion chamber. The concentration of the oxygen in the combustion chamber was measured and recorded when the flame of the sample went out. The LOI is calculated from the following equation:

LOI (%)=concentration of $O_2$ when the flame went out/(initial concentration of $N_2$+initial concentration of $O_2$).

Tensile Strength and Elongation Measurement

The tensile strength and elongation of the modified acrylonitrile-based copolymer fiber (a single fiber having a length of 20 mm) of each of the aforesaid examples and comparative examples were measured using a strength elongation measuring device (TEXCHNO FAVIMAT+).

Saturated Dyeability Measurement 0.6 g malachite green was mixed with 0.5 ml glacial acetic acid. The mixture was diluted with water to one liter so as to obtain a dye primary solution having a malachite green concentration of 0.6 (g-dye/l). 150 g of the dye primary solution was added into a flask. A 3 g specimen was placed in the dye primary solution (i.e., the on weight of fiber (O.W.F) of the malachite green was 3% OWF, (which is calculated by the following equation: O.W.F %=(0.6/1000)*150/3*100) in the flask for dyeing at 96° C. for 2 hours, followed by heating to 100° C. for 20 minutes. The dye primary solution was then cooled.

The used dye primary solution (after the dyeing) and the initial dye primary solution (before the dyeing) were diluted, and the wavelength absorbance thereof were measured at 610 nm wavelength using a spectrophotometer (Hitachi U-3010).

Saturated dyeability is calculated using the following equation:

Saturation value $(R)=[(B-A)/B]*3$ O.W.F. %, wherein A is the absorbance of the used dye primary solution, and B is the absorbance of the initial dye primary solution.

Whiteness Measurement

The whiteness of a sample of the modified acrylonitrile-based copolymer fiber (the sample having a weight of 1.2 g) was tested using a colorimeter (Tokyo Denshoku TC1800-MK II).

Spinnability Measurement

The spinnability of the modified acrylonitrile-based copolymer fiber was analyzed by stretching the same to a predetermined length, followed by observing any hole formed therein using an optical microscope (Nikon MM-40) and by measuring the tensile strength and elongation thereof. The spinnability is classified into 5 classes based on the number of factors being met. The factors are set such that the elongation is required to be greater than 32%, the tensile strength is required to be greater than 3.2 g/d, and the number of the hole(s) is zero. The spinnability classes are as follows.

Class 1: none of the factors is met and the fiber is unable to be spun. Spinnability was very poor.

Class 2: at least two of the factors are not met. Spinnability was poor.

Class 3: only one of the factors is not met. Spinnability was normal.

Class 4: only one of the factors is slightly not met. Spinnability was good.

Class 5: all of the factors are met. Spinnability was very good.

Tactile Feeling Test

Tactile feeling is classified into 5 classes which are as follows.

Class 1: The fiber is relatively rough. Tactile feeling was very poor.

Class 2: The fiber is slightly rough. Tactile feeling was poor.

Class 3: Tactile feeling was normal.

Class 4: The fiber is soft and smooth. Tactile feeling was good.

Class 5: The fiber is soft and smooth. Tactile feeling was excellent.

TABLE 2

| | modified acrylonitrile-based copolymer fiber | | | | | | |
|---|---|---|---|---|---|---|---|
| | LOI (%) | Elongation (%) | Strength (g/denier) | Saturated Fastness (%) | Whiteness | Spinnability | Tactile Impression |
| EX 1 | 28 | 35 | 3.2 | 1.8 | 65 | 3 | 4 |
| EX 2 | 28 | 37 | 3.5 | 2.2 | 64 | 5 | 5 |
| EX 3 | 28.5 | 38 | 3.4 | 1.7 | 64 | 4 | 4 |
| EX 4 | 28.5 | 32 | 3.1 | 1.5 | 62 | 5 | 4 |
| EX 5 | 28 | 31 | 2.9 | 1.5 | 62 | 4 | 5 |
| EX 6 | 28 | 34 | 3.1 | 1.4 | 64 | 4 | 4 |
| EX 7 | 28 | 31 | 3.2 | 1.8 | 64 | 4 | 4 |
| EX 8 | 28 | 30 | 3 | 2.2 | 64 | 4 | 4 |
| EX 9 | 28 | 31 | 3.2 | 2.1 | 64 | 4 | 4 |
| EX 10 | 27.5 | 30 | 3 | 2.4 | 65 | 4 | 4 |
| CE 1 | 29 | 30 | 3.2 | — | 62 | 3 | 2 |
| CE 2 | 30 | 31 | 3.1 | — | 61 | 3 | 1 |
| CE 3 | 28 | 22 | 2.4 | — | 56 | 2 | 2 |
| CE 4 | 28 | 24 | 2.6 | — | 55 | 2 | 2 |
| CE 5 | 27 | 20 | 2.1 | — | 56 | 2 | 2 |

Examples 11 to 14

EX11 to EX14

The procedures and conditions in preparing the flame retardant modified acrylonitrile-based copolymer fibers of Examples 11 to 14 were similar to Example 4 except for the compositions of the spinning dope solutions.

Before the spinning, each of the spinning dope solution of Examples 11 to 14 further contained 10 wt % $Sb_2O_5$ serving as a flame retardant based on the total weight of the spinning dope solution.

The flame retardant modified acrylonitrile-based copolymer fiber of each of Examples 12 to 14 was blended with cotton to obtain a flame retardant fibrous material. The contents of cotton of the flame retardant fibrous materials of Examples 11 to 14 were 30 wt %, 50 wt % and 70 wt %, respectively.

The compositions of the spinning dope solutions and limit oxygen indices of the flame retardant fibrous materials of Examples 11 to 14 are listed in Table 3.

Examples 15 and 16

EX15 and EX16

The procedures and conditions in preparing the flame retardant modified acrylonitrile-based copolymer fibers of Examples 15 and 16 were similar to Example 4 except for the composition of the spinning dope solution.

Before the spinning, the spinning dope solutions of Examples 15 and 16 further contained 5 wt % and 8 wt % $Sb_2O_5$ based on the total weight of the spinning dope solutions, respectively.

The compositions of the spinning dope solutions and limit oxygen indices of the flame retardant modified acrylonitrile-based copolymer fibers of Examples 15 to 16 are listed in Table 3.

TABLE 3

|  | Content of $Sb_2O_5$ (wt %) | Content of cotton (wt %) | LOI |
|---|---|---|---|
| EX11 | 10 | 0 | 34 |
| EX12 | 10 | 30 | 34.5 |
| EX13 | 10 | 50 | 33.5 |
| EX14 | 10 | 70 | 31.0 |
| EX15 | 5 | 0 | 32.0 |
| EX16 | 8 | 0 | 33.0 |

Examples 17 to 19

EX17 to EX19

The procedures and conditions in preparing the flame retardant modified acrylonitrile-based copolymer fibers of Examples 17 to 19 were similar to Example 2 except for the compositions of the spinning dope solution.

The spinning dope solution of Example 17 further contained 8 wt % $Sb_2O_5$ and 3 wt % $Al(OH)_3$ based on the total weight of the spinning dope solution.

The spinning dope solution of Example 18 further contained 8 wt % $Sb_2O_5$ and 6 wt % $Al(OH)_3$ based on the total weight of the spinning dope solution.

The spinning dope solution of Example 19 further contained 10 wt % $Sb_2O_5$ and 3 wt % $Al(OH)_3$ based on the total weight of the spinning dope solution.

The flame retardant modified acrylonitrile-based copolymer fibers of Examples 17 and 19 were blended with 50 wt % and 70 wt % cotton, respectively, so as to obtain the flame retardant fibrous materials.

The compositions of the spinning dope solutions and the limit oxygen indexes of the flame retardant fibrous materials of Examples 17 to 19 are listed in Table 4.

TABLE 4

| | Content of $Sb_2O_5$ (wt %) | Content of $Al(OH)_3$ (wt %) | LOI | | |
|---|---|---|---|---|---|
| | | | 0 wt % cotton | 50 wt % cotton | 70 wt % cotton |
| EX17 | 8 | 3 | 33.5 | 33 | 29 |
| EX18 | 8 | 6 | 34.5 | 33 | 30.5 |
| EX19 | 10 | 3 | 34.5 | 34 | 31 |

In conclusion, by formulating the first and second compositions to form first and second prepolymers or first and second copolymers, respectively, and then polymerizing the first and second prepolymers or blending the first and second copolymers according to the method of this invention, the aforesaid drawbacks associated with the prior art can be alleviated.

With the invention thus explained, it is apparent that various modifications and variations can be made without departing from the spirit of the present invention. It is therefore intended that the invention be limited only as recited in the appended claims.

What is claimed is:

1. A method for preparing a flame retardant modified acrylonitrile-based copolymer, comprising:
   (a) prepolymerizing a first composition to obtain a first prepolymer solution including a first prepolymer;
   (b) prepolymerizing a second composition to obtain a second prepolymer solution including a second prepolymer; and
   (c) mixing the first and second prepolymer solutions and subjecting a mixture of the first and second prepolymers to polymerization to obtain a flame retardant modified acrylonitrile-based copolymer solution containing a flame retardant modified acrylonitrile-based copolymer;
   wherein the first composition includes acrylonitrile, a halogen-containing vinyl monomer, at least one hydrophilic vinyl monomer, a polar solvent, and a reaction initiator, the halogen-containing vinyl monomer including vinylidene chloride;
   wherein based on the total weight of vinylidene chloride, the hydrophilic vinyl monomer and acrylonitrile of the first composition, vinylidene chloride of the first composition is in an amount ranging from 10 to 40 wt % and the hydrophilic vinyl monomer is in an amount ranging from 5 to 50 wt %;
   wherein the first prepolymer has a weight average molecular weight ranging from 30,000 to 40,000;
   wherein the second composition includes acrylonitrile, a halogen-containing vinyl monomer, the polar solvent, and the reaction initiator, the halogen-containing vinyl monomer of the second composition including vinylidene chloride;
   wherein based on the total weight of vinylidene chloride and acrylonitrile of the second composition, vinylidene chloride of the second composition is in an amount ranging from 40 to 60 wt %; and
   wherein the flame retardant modified acrylonitrile-based copolymer has a weight average molecular weight ranging from 50,000 to 80,000 and contains 30 to 46 wt % of vinylidene chloride monomer unit, 1 to 5 wt % of hydrophilic vinyl monomer unit, and 49 to 69 wt % of acrylonitrile monomer unit based on the total weight of the vinylidene chloride monomer unit, the hydrophilic vinyl monomer unit and the acrylonitrile monomer unit of the flame retardant modified acrylonitrile-based copolymer.

2. The method of claim 1, wherein the prepolymerization in steps (a) and (b) is conducted under a temperature ranging from 20 to 70° C.

3. The method of claim 1, wherein the weight ratio of the first prepolymer solution to the second prepolymer solution in step (c) ranges from 0.1:1 to 10:1.

4. The method of claim 1, wherein the hydrophilic vinyl monomer is selected from a sulfonic group-containing vinyl monomer and a carboxylic group-containing vinyl monomer.

5. The method of claim 1, wherein the first composition further includes a yellowing inhibitor.

6. The method of claim 1, further comprising:
  (d) removing a portion of the polar solvent from the flame retardant modified acrylonitrile-based copolymer solution after step (c), such that the flame retardant modified acrylonitrile-based copolymer is in an amount ranging from 20 to 35 wt % based on the total weight of the flame retardant modified acrylonitrile-based copolymer solution.

7. The method of claim 1, wherein the weight ratio of vinylidene chloride to acrylonitrile of the first composition ranges from 2:1 to 3.5:1, and the second prepolymer has a weight average molecular weight ranging from 30,000 to 40,000.

8. The method of claim 1, wherein based on the total weight of vinylidene chloride, the hydrophilic vinyl monomer and acrylonitrile of the first composition, vinylidene chloride of the first composition is in an amount ranging from 20 to 30 wt %, the hydrophilic vinyl monomer is in an amount ranging from 5 to 15 wt %, and the weight ratio of vinylidene chloride to acrylonitrile of the first composition ranges from 2:1 to 3.5:1; wherein based on the total weight of vinylidene chloride and acrylonitrile of the second composition, vinylidene chloride of the second composition is in an amount ranging from 45 wt % to 55 wt %; and wherein the flame retardant modified acrylonitrile-based copolymer contains 38 to 42 wt % of the vinylidene chloride monomer unit, 2.5 to 5 wt % of the hydrophilic vinyl monomer unit, and 55.5 to 59.5 wt % of the acrylonitrile monomer unit based on the total weight of the vinylidene chloride monomer unit, the hydrophilic vinyl monomer unit and the acrylonitrile monomer unit of the flame retardant modified polyacrylonitrile-based copolymer.

9. A method for preparing a flame retardant modified acrylonitrile-based copolymer, comprising:
  (a) polymerizing a first composition to obtain a first copolymer solution including a first copolymer;
  (b) polymerizing a second composition to obtain a second copolymer solution including a second copolymer; and
  (c) mixing the first and second copolymer solutions to obtain a flame retardant modified acrylonitrile-based copolymer solution containing a flame retardant modified acrylonitrile-based copolymer blend;
  wherein the first composition includes acrylonitrile, a halogen-containing vinyl monomer, at least one hydrophilic vinyl monomer, a polar solvent, and a reaction initiator, the halogen-containing vinyl monomer including vinylidene chloride;
  wherein based on the total weight of vinylidene chloride, the hydrophilic vinyl monomer and acrylonitrile of the first composition, vinylidene chloride of the first composition is in an amount ranging from 10 to 40 wt % and the hydrophilic vinyl monomer is in an amount ranging from 5 to 50 wt %;
  wherein the first copolymer has a weight average molecular weight ranging from 70,000 to 80,000;
  wherein the second composition includes acrylonitrile, a halogen-containing vinyl monomer, the polar solvent, and the reaction initiator, the halogen-containing vinyl monomer of the second composition including vinylidene chloride;
  wherein based on the total weight of vinylidene chloride and acrylonitrile of the second composition, vinylidene chloride of the second composition is in an amount ranging from 40 to 60 wt %;
  wherein the second copolymer has a weight average molecular weight ranging from 50,000 to 60,000; and
  wherein the flame retardant modified acrylonitrile-based copolymer blend has a viscosity-average molecular weight ranging from 50,000 to 80,000, and contains 30 to 46 wt % of vinylidene chloride monomer unit, 1 to 5 wt % of hydrophilic vinyl monomer unit, and 49 to 69 wt % of acrylonitrile monomer unit based on the total weight of the vinylidene chloride monomer unit, the hydrophilic vinyl monomer unit and the acrylonitrile monomer unit of the flame retardant modified acrylonitrile-based copolymer blend.

10. The method of claim 9, wherein the polymerization in steps (a) and (b) is conducted under a temperature ranging from 20 to 70° C.

11. The method of claim 9, wherein the weight ratio of the first copolymer solution to the second copolymer solution in step (c) ranges from 0.1:1 to 10:1.

12. The method of claim 9, wherein the hydrophilic vinyl monomer is selected from a sulfonic group-containing vinyl monomer and a carboxylic group-containing vinyl monomer.

13. The method of claim 9, wherein the first composition further includes a yellowing inhibitor.

14. The method of claim 9, further comprising:
  (d) removing a portion of the polar solvent from the flame retardant modified acrylonitrile-based copolymer solution after step (c), such that the flame retardant modified acrylonitrile-based copolymer blend is in an amount ranging from 20 to 35 wt % based on the total weight of the flame retardant modified acrylonitrile-based copolymer solution.

15. The method of claim 9, wherein the second composition is substantially free of the hydrophilic vinyl monomer.

16. A flame retardant fibrous material comprising an acrylonitrile-based copolymer fiber that is made from a composition comprising a flame retardant modified acrylonitrile-based copolymer prepared according to the method as claimed in claim 1, said flame retardant modified acrylonitrile-based copolymer having a limiting oxygen index greater than 27%.

17. The flame retardant fibrous material of claim 16, further comprising an auxiliary fiber selected from the group consisting of a natural fiber, a synthetic fiber, and the combination thereof.

18. The flame retardant fibrous material of claim 16, further comprising a flame retardant selected from the group consisting of $Sb_2O_5$, $Sb_2O_3$, $Al(OH)_3$, $Mg(OH)_2$, and combinations thereof.

* * * * *